US005500280A

United States Patent [19]

Yamazaki et al.

[11] Patent Number: 5,500,280

[45] Date of Patent: Mar. 19, 1996

[54] ELASTOMER-BASED CONNECTOR SHEET

[75] Inventors: Kouichi Yamazaki; Nobuyoshi Ogawa, both of Nagano, Japan

[73] Assignee: Shin-Etsu Polymer Co., Ltd., Tokyo, Japan

[21] Appl. No.: 501,586

[22] Filed: Jul. 12, 1995

[30] Foreign Application Priority Data

Aug. 12, 1994 [JP] Japan .................................... 6-190505

[51] Int. Cl.[6] .......................................................... B32B 9/00

[52] U.S. Cl. .......................... 428/220; 428/221; 428/295; 428/357; 428/387; 428/390; 428/391; 428/418; 428/450; 428/901; 428/902

[58] Field of Search .................................... 428/105, 114, 428/220, 221, 295, 391, 418, 450, 901, 902, 357, 387, 390

[56] References Cited

U.S. PATENT DOCUMENTS 4,507,341 3/1985 Heseltine ................................ 428/295
4,931,365 6/1990 Inoue et al. ............................. 428/901
5,137,766 8/1992 Mazanek et al. ........................ 428/902
5,218,351 6/1993 Hashihawa .............................. 428/295
5,407,740 4/1995 Jessen ..................................... 428/295
5,419,949 5/1995 Marx et al. ............................. 428/295

*Primary Examiner*—James J. Bell
*Attorney, Agent, or Firm*—Wenderoth, Lind & Ponack

[57] ABSTRACT

An improved elastomer-based connector sheet for use to electrically connect electrode terminals is proposed which comprises, in the form of an integral sheet: (a) a matrix in the form of a sheet made from an electrically insulating rubber having a specified rubber hardness; and (b) a multiplicity of straightly extending wire segments of a metal having a specified volume resistivity and having a diameter in the range from 20 to 90 μm embedded in the matrix of the rubber substantially in parallel each with the others in such a direction that the bias angle formed with the direction perpendicular to the surface of the sheet is in the range from 20° to 60° in such a fashion that each of the wire segments has the ends exposed on the surfaces of the matrix sheet and the distance between the surfaces of adjacent wire segments is at least 10 μm, the distribution density of the ends of the wire segments exposed on the sur-face of the matrix sheet being in the range from 70 to 1000 per $mm^2$.

4 Claims, 4 Drawing Sheets

ELASTOMER-BASED CONNECTOR SHEET

BACKGROUND OF THE INVENTION

The present invention relates to an elastomer-based connector sheet or, more particularly, to an elastomer-based connector sheet having high flexibility and suitable for use, for example, in electrically connecting terminals of a surface-mountable IC package and an electronic circuit board as in the inspection of IC packages with high resolution even when the arrangement pitch of the terminals is extremely fine.

It is usually practiced heretofore, when a surface-mountable IC package is to be electrically connected to an electronic circuit board, for example, for the inspection of IC packages, that the terminals of a surface-mountable IC package are directly connected to the respective terminals of the electronic circuit board by clamping or by soldering or, alternatively, an IC socket is used to connect an IC package and the circuit board.

Along with the remarkable trend in surface-mountable IC packages of recent years toward larger and larger number of the terminals and finer and finer arrangement pitch of the terminals, however, problems are caused in the above mentioned methods for connecting the terminals of a surface-mountable IC package and the terminals of the circuit board. When electrical connection is effected by clamping or by soldering, for example, the reliability in the electrical connection is low because of eventual deformation of the terminals or bridging between terminals by the solder alloy or incomplete soldering not to ensure electrical connection between terminals requiring extremely high skillfulness of the workers if not to mention possible secondary troubles such as damages on the surface-mountable IC package per se, severance of the terminals on the circuit board and so on.

When an IC socket is used for connection, an IC socket cannot be provided with so many pins at a so fine arrangement pitch as a matter of practice to comply with modern surface-mountable IC packages resulting in eventual break or bending of the terminals of the IC package not to ensure high efficiency and good reliability of the electric connection.

SUMMARY OF THE INVENTION

The present invention accordingly has an object to provide a novel and improved elastomer-based connector sheet having flexibility by which the terminals of a surface-mountable IC package can be electrically connected to the terminals of an electronic circuit board with good resolution and reliability.

Thus, the elastomer-based connector sheet provided by the present invention is an integral body in the form of a sheet having a thickness in the range from 0.5 to 2.0 mm or, preferably, from 0.5 to 1.0 mm which comprises:

(a) a matrix in the form of a sheet made from an electrically insulating rubber having a Type A hardness according to JIS K 6301 in the range from 20 to 60; and (b) a multiplicity of straightly extending wire segments of a metallic material having a volume resistivity not exceeding $10^{-1}$ ohm.cm at room temperature and having a diameter in the range from 20 to 90 μm embedded in the matrix of the rubber substantially in parallel each with the others in such a direction that the angle formed with the direction perpendicular to the surface of the sheet is in the range from 20° to 60° in such a fashion that each of the wire segments has the ends exposed on the surfaces of the matrix sheet and the distance between the surfaces of adjacent wire segments is at least 10 μm, the distribution density of the ends of the wire segments exposed on the surface of the matrix sheet being in the range from 70 to 1000 per mm$^2$.

DETAILED DESCRIPTION OF THE PREFERRED EMBODIMENTS

Figure 1:
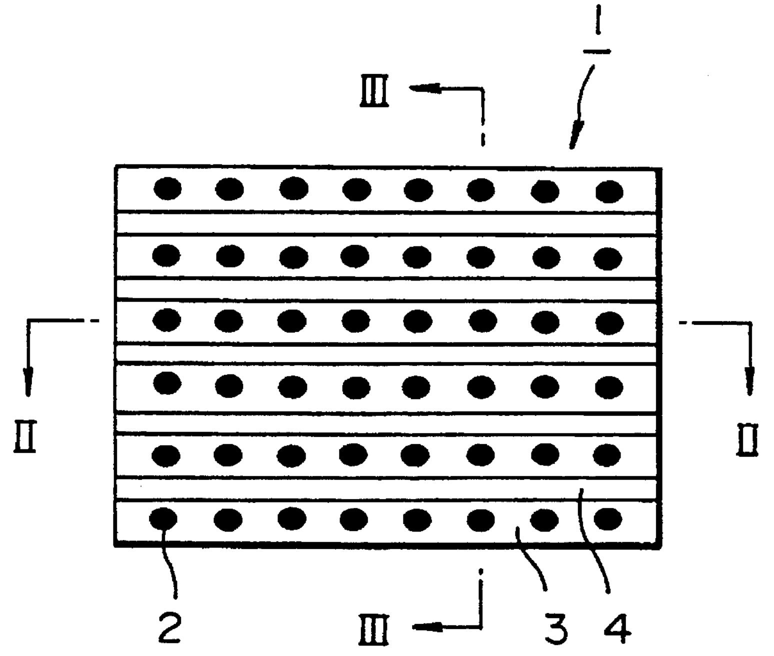
FIG. 1 is an enlarged partial plan view of the inventive connector sheet.

As is described above, the elastomer-based connector sheet of the invention is an integral body consisting of a matrix phase of an electrically insulating rubber sheet having a specified hardness and a dispersed phase of a multiplicity of metallic fine wire segments embedded in the matrix substantially in parallel each with the others extending in a specified direction and in a specified distribution density, each of the ends of the wire segments being exposed on the surface of the matrix sheet of rubber.

The metallic wire segments embedded in the insulating rubbery matrix of the inventive connector sheet should have a volume resistivity not exceeding $10^{-1}$ ohm-cm in order to ensure a low conduction resistance to be established when the connector sheet is used for connecting electrode terminals. Suitable metallic wires include pure gold wires, wires of a gold-based alloy, wires of a metal having a plating layer of gold, wires of a solder alloy, wires of a metal having a plating layer of a solder alloy, and wires of a copper-based alloy. Particularly preferable are wires of pure gold and gold-plated wires of brass. The metallic wires should have a diameter not exceeding 90 μm or, preferably, in the range from 20 to 70 μm.

The rubbery material to form the matrix phase of the inventive connector sheet has a high volume resistivity of at least $10^{12}$ ohm.cm in order to ensure high insulation between the wire segments embedded in the matrix phase. Suitable rubbery materials include certain elastomeric heat-curable resins such as silicone resins and epoxy resins, synthetic rubbers and elastomeric thermoplastic resins such as polyethylenes, polyurethanes, ABS resins and plasticized polyvinyl chloride resins, of which silicone rubbers are preferred when weatherability to withstand adverse environmental conditions and heat and cold resistance are of importance.

It is important that the rubbery material as the matrix phase of the inventive connector sheet has a relatively low hardness in order to ensure good electrical contact between the exposed ends of the wire segments embedded in the matrix and the surface of the terminals contacted therewith. For example, the rubbery material has a Type A hardness in the range from 20 to 60 or, preferably, from 30 to 60 as determined by the procedure specified in JIS K 6301 in consideration of the durability or stability of the rubbery matrix against repeated compression. Tear strength, which should be at least 10 kg/mm, is also an important factor to secure the wire segments therein with reliability. In this regard, the adhesive bonding strength between the matrix phase and each of the embedded wire segments, which can be estimated from the adhesive bonding test by using a rubber sheet and a metal foil, is desirably at least 10 g per wire segment.

The rubbery matrix sheet has a thickness in the range from 0.5 to 2.0 mm or, preferably, from 0.5 to 1 mm. When the thickness is too small, no reliable electric connection can be obtained between the wire segments and the surface of the electrode terminals while, when the thickness is too large, a considerable displacement would be necessary between a terminal on the IC package and a terminal on the circuit board to be electrically connected together through the connector sheet.

It is essential in the inventive connector sheet that the above described fine metallic wire segments are embedded in the matrix of the rubbery material in a specific fashion. Firstly, the wire segments are aligned in substantially the same direction or, in other words, substantially in parallel each with the others. Secondly, each of the wire segments penetrates the rubbery matrix sheet so that each end of the wire segments is exposed on the surface of the matrix sheet. Thirdly, each of the wire segments embedded in the matrix sheet extends in such a direction that the angle between the direction of the wire segment and the direction of the thickness of the matrix sheet, i.e. the direction perpendicular to the surface of the matrix sheet, referred to as the bias angle hereinafter, is in the range from 20° to 60°. Fourthly, the distance between the surfaces of wire segments is at least 10 μm. Fifthly, the distribution density of the wire segments or the density of the segment ends exposed on the surface of the matrix sheet is in the range from 70 to 1000 per $mm^2$ or, preferably, from 100 to 1000 per $mm^2$.

According to the second requirement mentioned above, it is essential that the ends of each of the embedded wire segments are exposed on the surface of the rubbery matrix sheet. It is preferable that at least one of the ends of each wire segment is protruded above the surface of the matrix sheet in a height of 5 μm to 30 μm in order to ensure reliableness of the electrical contact between the wire end and the surface of the terminal although the protrusion should not exceed 30 μm because of the possibility of bending of the protruded portion of the wire segment eventually to come into contact with the adjacent wire segments.

When the distribution density of the wire segments in the matrix sheet is too low to satisfy the above mentioned fifth requirement, it would be a possible case that one of the electrode terminals coming into contact with the connector sheet is connected to the exposed end of only a single wire segment when the arrangement pitch of the terminals is so fine as to be 1.0 mm or smaller to cause a difficulty in relative positioning of the terminal array and the connector sheet while, when the distribution density of the wire segments is too high, the fourth requirement for the insulation between adjacent wire segments can hardly be satisfied.

The above mentioned requirement for the bias angle of the wire segments is given for the following reasons. Namely, each of the wire segments is expected not to cause buckling when the connector sheet is compressed between two terminals so that, when the bias angle is too small, buckling of the wire segments would take place under compression or, if the wire segment is so rigid, compression of the connector sheet under pressure cannot take place with the wire segments acting as something like a prop not to ensure reliableness of electrical connection. When the bias angle is too large, on the other hand, the advantageous phenomenon of so-called "wiping effect", by which the oxidized surface film on the terminal surface disturbing electric conduction is broken or pierced through by the protruded end portion of the wire segments, can no longer be obtained to decrease the reliableness of electric connection.

When constructed in the above described fashion, the elastomer-based connector sheet of the invention can be used for electrode terminals of various types including so-called BAG (ball-grid array), in which semispherical bumps of a solder alloy are provided in an array on the back surface of a surface-mountable IC package, LGA (land-grid array) or LCC (leadless chip carrier), in which fiat electrode pads are provided on the back surface or peripheral portion of the IC package, PLCC (plastic leaded chip carrier) or QFP (quad fiat package), in which each of the side surfaces of an IC package has an array of terminal pins in a J-wise bent fashion or in a gull-wing fashion, and so on.

A typical procedure for the preparation of the above described elastomer-based connector sheet of the invention is as follows. In the first place, a multiplicity of fine metal wires are arranged in a fine grid-like fashion on a thin sheet of a thermally curable silicone rubber composition with parallelism of each with the others at a uniform distance from the adjacent wires followed by overlaying of another sheet of the silicone rubber composition to form a laminate consisting-of two silicone rubber sheets and a grid-like array of the fine metal wires sandwitched therebetween and curing of the silicone rubber sheets by heating under pressure to give an integrally laminated silicone rubber sheet with the wire array embedded therein. The next step is to stack a large number of such laminated sheets one on the other with a layer of adhesive in such a fashion that the metal wires in all of the laminated sheets run in the same direction followed by heating of the thus stacked laminated sheets into a multiple-laminated single block by curing the adhesive. Finally, the thus obtained multiple-laminated block is sliced in a plane making an angle with the running direction of the metal wires.

In the following, the elastomer-based connector sheet of the invention is described in more detail by making reference to the accompanying drawing.

FIG. 1 is an enlarged partial plan view of the inventive connector sheet 1, of which the matrix phase consists of a multiplicity of cured silicone rubber sheets 3 bonded together into a single body by means of the layers 4 of an adhesive each intervening between two silicone rubber sheets 3. A number of fine metal wire segments 2 in a grid-like array are embedded in each of the silicone rubber sheets 3. It is essential that the direction of each of the wire segments 2 is not perpendicular to the plane of the sheet 1 or not in parallel to the normal line of the surface plane but makes a bias angle of 20° to 60° with the normal line. Accordingly, the cross section of each wire segment appearing on the surface is not circular but elliptic with an ellipticity depending on the bias angle.

Figure 2:
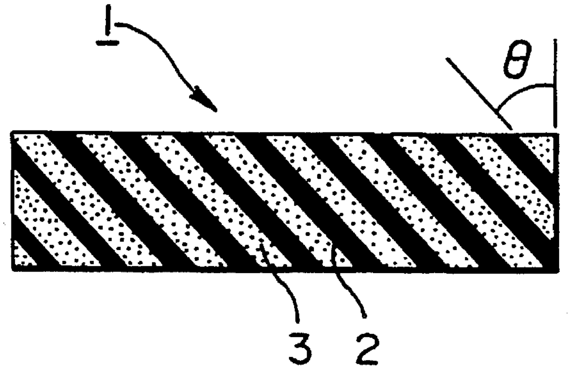
FIG. 2 is an enlarged partial cross sectional view of the inventive connector sheet as cut and viewed along the line II—II in FIG. 1.

FIG. 2 is a partial vertical cross sectional view of the inventive connector sheet 1 illustrated in FIG. 1 as cut and viewed along the line II—II. A number of the metallic wire segments 2 in a grid-like array are embedded in the matrix of the cured silicone rubber sheet 3 and each of the wire segments 2 makes an angle θ, e.g., 45°, which is called the bias angle, with the direction of the normal line to the sheet surface.

Figure 3:
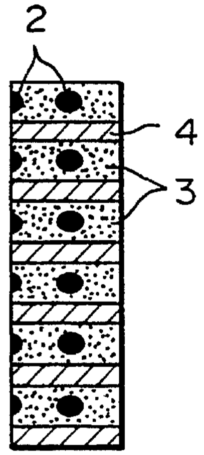
FIG. 3 is an enlarged partial cross sectional view of the inventive connector sheet as cut and viewed along the line III—III in FIG. 1.

FIG. 3 is another partial vertical cross sectional view of the inventive connector sheet 1 illustrated in FIG. 1 as cut and viewed along the line III—III, in which a number of the wire segments 2 in an array are embedded in each of the silicone rubber sheets 3 bonded together with adhesive layers 4 intervening between two silicone rubber sheets 3. Although the cross section of the wire segments 2 exposed on the surface of the sheet 1 is flush with the surface in FIGS. 2 and 3, it is sometimes advantageous, as is mentioned before, that the cut ends of the wire segments 2 are slightly protruded above the surface of the sheet 1. When the bias angle θ of the wire segments 2 is adequately selected, the wire segments 2 are safe from buckling even under a compressive force applied to the connector sheet 1 and the wire segments 2 never act as a prop to disturb elastic compression of the connector sheet 1 under compressive force.

In the following, an example is given to more fully illustrate the elastomer-based connector sheet of the invention.

EXAMPLE

A curable, electrically insulating silicone rubber composition was prepared by uniformly blending 70 and 30 parts by weight of two different silicone rubber compounds KE 153U and KE 761VB (each a product by Shin-Etsu Chemical Co.), respectively, with 0.5 and 2.5 parts by weight of two kinds of curing agents C-19A and C19B (each a product by the same company, supra), respectively, and 1.0 part by weight of a silane coupling agent KBM 403 (a product by the same company, supra). The thus prepared silicone rubber composition was sheeted in a thickness of 0.03 mm on a polyester film as a carrier to exhibit thermal shrinkage of 0.5% by curing having a thickness of 50 μm and with the surface sand-blasted to have a surface roughness Ra of 0.8 μm followed by a treatment with a surface active agent.

Fine brass wires of 40 μm diameter having a volume resistivity of $10^{-3}$ ohm.cm and plated with an alloy of gold and cobalt in a thickness of 0.4 μm were put on one of the above prepared silicone rubber sheets on a polyester film in a grid-like parallel alignment in a pitch of 0.1 mm and overlayed with another silicone rubber sheet to form a laminate which was, after aging under a pressure of 6 kgf/cm$^2$ for 8 minutes, subjected to curing at 120° C. for 15 minutes to give an integrally laminated sheet with an array of the metallic wires embedded therein followed by peeling of the polyester films from the surfaces of the cured silicone rubber layers.

A number of the thus prepared laminated sheets each holding an array of the metallic wires embedded therein were stacked one on the other with an intervening 0.03 mm thick layer of a silicone-based adhesive KE 1935A/B (a product by the same company, supra) capable of being cured into a silicone rubber having a JIS A hardness of 50 in such a fashion that the wires in all of the laminated sheets were extended in the same direction. The stack of the sheets was, after deaeration in vacuum, heated at 120° C. for 10 minutes to effect curing of the adhesive layers so that an integral block having a stratified structure was obtained. The adhesive bonding strength between a single metallic wire and the matrix phase of the cured silicone rubber was estimated to be 40 g.

The block having a stratified structure thus obtained was then sliced in parallel planes intersecting the metallic wires in alignment making an angle of 45° to give connector sheets of the invention each having a thickness of 1.0 mm, which were subjected to a heat treatment at 200° C. for 2 hours in order to remove any volatile materials contained in the cured silicone rubber layers.

For comparison, connector sheets were prepared in just the same manner as above except that the cured block having a stratified structure was sliced in parallel planes each perpendicular to the direction of the metallic wires or, in other words, with a bias angle of 0°.

The inventive and comparative connector sheets prepared in the above described manner were subjected to the evaluation tests to give the following results and conclusions.

Figure 4:
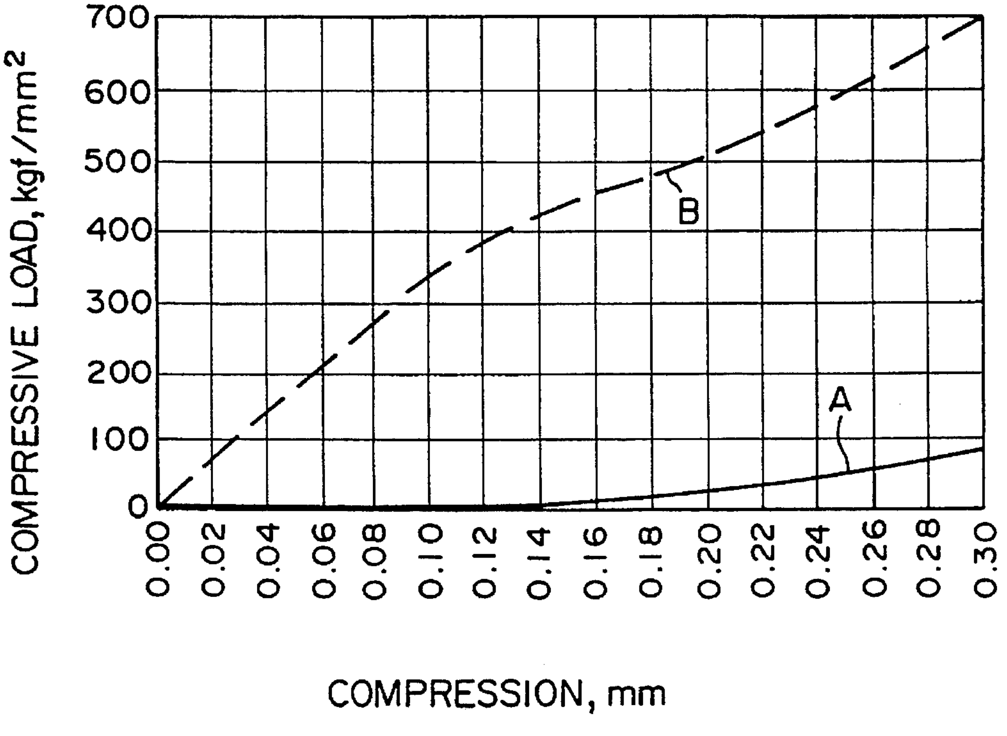
FIG. 4 is a graph showing the relationship between compression and compressive load.

Firsfly, the stress-strain relationship when a compressive force was applied increasing at a rate of 0.5 mm/minute in the direction of thickness of the connector sheet was obtained for the connector sheets to give the results shown in FIG. 4 by the curve A for the inventive connector sheet and by the curve B for the comparative connector sheet. As is understood from this graph, a much smaller compressive load was sufficient on the inventive connector sheet than on the comparative connector sheet to give the same amount of compression.

Figure 5:
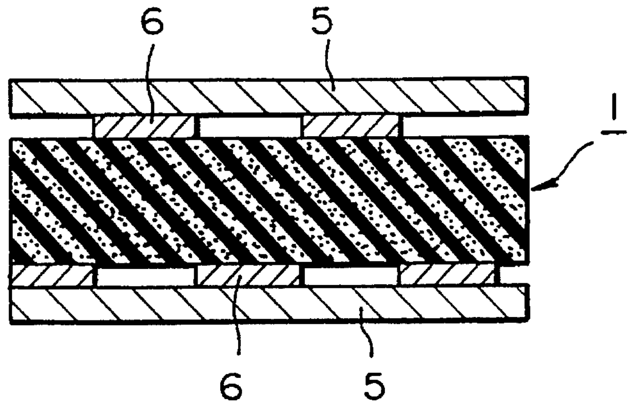
FIG. 5 is a partial vertical cross sectional view of the inventive connector sheet sandwitched between two sets of terminals on the respective circuit boards.
Figure 6:
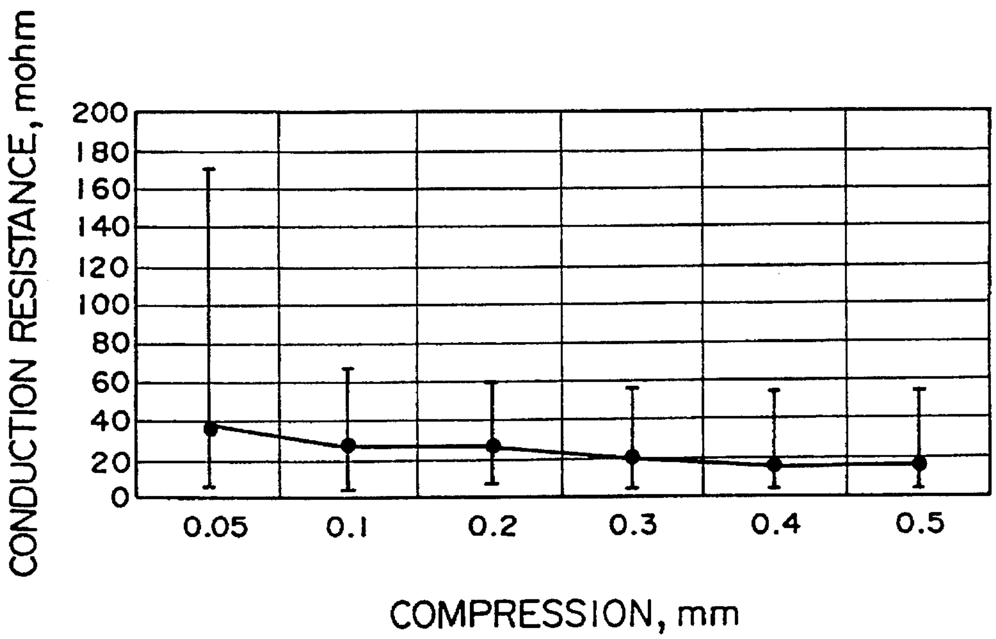
FIG. 6 is a graph showing the conduction resistance between the terminals on the oppositely facing circuit boards through the inventive connector sheet.

Secondly, a connector sheet 1 of 1 mm thickness according to the invention, in which each end of the wire segments 2 embedded in the matrix sheet 3 was protruded above the surface of the matrix sheet 3 by a height of 10 μm, was sandwitched, as is illustrated in FIG. 5 by a cross sectional view, between two circuit boards 5 each having gold-plated electrode terminals 6 each with dimensions of 0.25 mm by 0.25 mm by 0.1 mm and the conduction resistance between two electrode terminals 6 contacting with the opposite surfaces of the connector sheet 1 was measured as a function of the compression of the connector sheet 1 to give the results shown in FIG. 6, from which it was concluded that the inventive connector sheet was usable even under a very small compressive force to cause a compression of only 5%.

Figure 7:
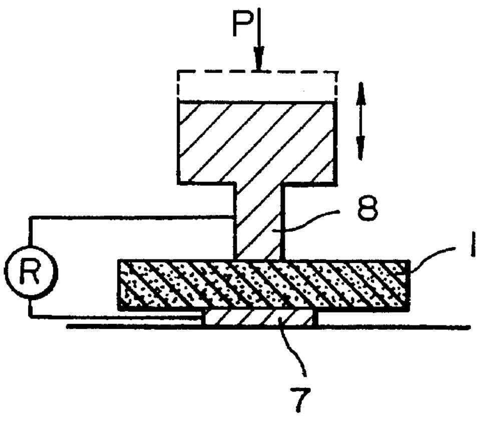
FIG. 7 is a vertical cross section of the testing assembly for the durability test of the inventive connector sheet against repeated compression and release.
Figure 8:
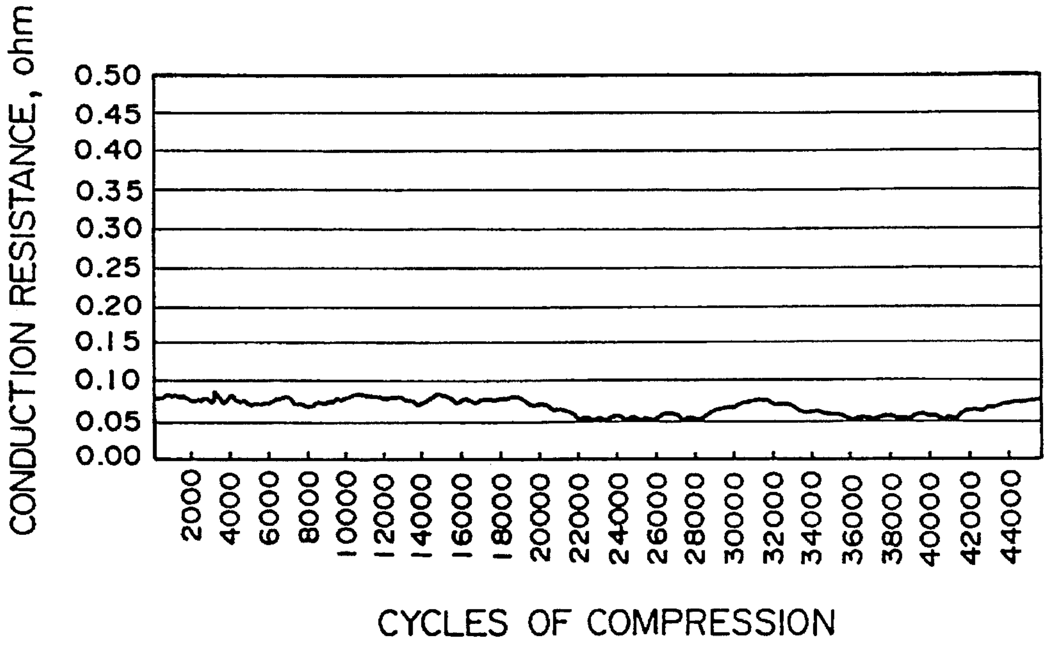
FIG. 8 is a graph showing the conduction resistance of the inventive connector sheet after repeated compressions.

Thirdly, as is illustrated in FIG. 7 by a cross sectional view, the inventive connector sheet of 1 mm thickness was placed on a 10 mm by 10 mm square gold-made base electrode 7 and repeatedly compressed with a gold-plated presser electrode 8 of 0.5 mm diameter according to the cycles each consisting of pressing under a load of 100 g on the presser electrode 8 for 1 second and a 2-seconds long interval of release between two pressing stage up to 45,000 cycles to measure the conduction resistance between the electrodes 7, 8 as a function of the number of compression-release cycles to give the result shown in FIG. 8. This result supports the conclusion that the durability of the inventive connector sheet is very high even under an adverse condition of repeated compression and release.

What is claimed is:

1. An elastomer-based connector sheet which comprises, as an integral body in the form of a sheet having a thickness in the range from 0.5 to 2.0 mm:

(a) a matrix in the form of a sheet made from an electrically insulating rubber having a Type A hardness according to JIS K 6301 in the range from 20 to 60; and (b) a multiplicity of straightly extending wire segments of a metal having a volume resistivity not exceeding $10^{-1}$ ohm.cm at room temperature and having a diameter in the range from 20 to 90 μm embedded in the matrix of the rubber substantially in parallel each with the others in such a direction that the bias angle formed with the direction perpendicular to the surface of the sheet is in the range from 20° to 60° in such a fashion that each of the wire segments has the ends exposed on the surfaces of the matrix sheet and the distance between the surfaces of adjacent wire segments is at least 10 μm, the distribution density of the ends of the wire segments exposed on the surface of the matrix sheet being in the range from 70 to 1000 per $mm^2$.

2. The elastomer-based connector sheet as claimed in claim 1 in which at least one of the ends of each of the wire segments is protruded above the surface of the matrix sheet by a height in the range from 5 μm to 30 μm.

3. The elastomer-based connector sheet as claimed in claim 1 in which the electrically insulating rubber has a Type A hardness according to JIS K 6301 in the range from 30 to 60.

4. The elastomer-based connector sheet as claimed in claim 1 in which the wire segments have a diameter in the range from 20 to 70 μm.

* * * * *